United States Patent
Ko et al.

(10) Patent No.: US 8,294,373 B2
(45) Date of Patent: Oct. 23, 2012

(54) ILLUMINATION APPARATUS AND CONTROL DEVICE FOR CONTROLLING THE ILLUMINATION APPARATUS

(75) Inventors: Hung-Chang Ko, Taipei Hsien (TW);
Suo-Bing Su, Taipei Hsien (TW);
Po-Wei Kuo, Taipei Hsien (TW);
Chih-Yuan Yang, Taipei Hsien (TW);
Wen-Chun Chen, Taipei Hsien (TW);
Li-Cheng Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 628 days.

(21) Appl. No.: 12/482,385

(22) Filed: Jun. 10, 2009

(65) Prior Publication Data
US 2009/0315466 A1    Dec. 24, 2009

(30) Foreign Application Priority Data
Jun. 20, 2008    (CN) .......................... 2008 1 0302243

(51) Int. Cl.
*H05B 37/02* (2006.01)
*H05B 39/04* (2006.01)
*H05B 41/36* (2006.01)

(52) U.S. Cl. ......... 315/149; 315/156; 315/158; 315/159
(58) Field of Classification Search .................. None
See application file for complete search history.

(56) References Cited

U.S. PATENT DOCUMENTS

| | | | |
|---|---|---|---|
| 2010/0052866 A1* | 3/2010 | Elferich et al. | 340/10.5 |
| 2010/0201267 A1* | 8/2010 | Bourquin et al. | 315/32 |

* cited by examiner

*Primary Examiner* — Anh Tran
(74) *Attorney, Agent, or Firm* — Altis Law Group, Inc.

(57) ABSTRACT

An illumination apparatus is provided. The apparatus includes a power supply unit, a switch unit, a bulb, a wireless unit, and a control unit. The power supply unit is for supplying power. The switch unit is for opening or closing a circuit between the power source unit and the bulb. The wireless unit is for receiving wireless signals from an external control device, and generating a first control signal when receiving the wireless signals. The control unit is for generating a close signal according to the first control signal. The switch unit closes the circuit between the power source unit and the bulb according to the close signal to enable the bulb to keep emitting light; and opens the circuit between the power source unit and the bulb if no receiving the close signal, thereby keeping the bulb extinguishing. A related control device for controlling the apparatus is also provided.

11 Claims, 5 Drawing Sheets

ILLUMINATION APPARATUS AND CONTROL DEVICE FOR CONTROLLING THE ILLUMINATION APPARATUS

BACKGROUND

1. Technical Field

The present disclosure relates to road traffic equipment, particularly to an illumination apparatus and a control device for controlling the illumination apparatus.

2. Description of Related Art

Current street lamps always turn on all night or turn off after a predetermined time. However, some road segments may not have any traffic for extended periods of time, as a result, power consumption of the street lamps along such road segments is a waste.

Therefore, what is needed is an improved illumination apparatus and a control device for controlling the illumination apparatus which can overcome the problem described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
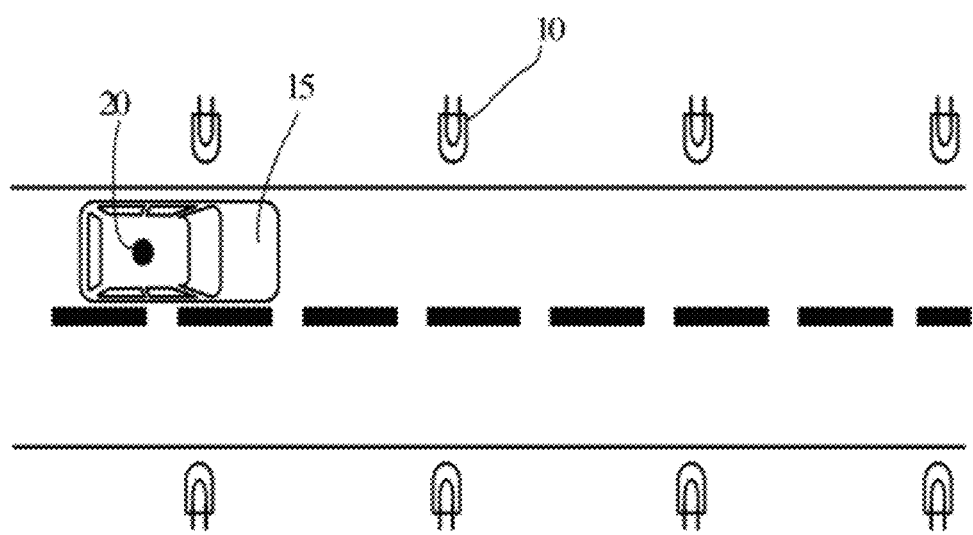
FIG. 1 is a schematic diagram of an infrastructure of an illumination system according to an exemplary embodiment.

Referring to FIG. 1, an illumination system is disclosed. The illumination system is capable of generating wireless signals to enable illumination apparatus(es) 10, which is(are) in a range covered by the wireless signals, to emit light, while other illumination apparatus(es) 10, which is(are) out of the coverage range of the wireless signals, remain off, thereby saving power. For illustrative purposes, a street lamp is taken as the illumination apparatus 10.

The illumination system includes a plurality of illumination apparatuses (i.e., street lamps) 10 and a control device 20. The control device 20 is configured in a mobile object 15, for example, such as an automobile. The control device 20 is capable of continuously sending out the wireless signals to enable the street lamp(s) 10, which is(are) in the coverage range of the wireless signals, to emit light. The street lamps 10 may be situated along one or both sides of the street. Each of the street lamps 10 includes a wireless unit 110 (see FIG. 2) for receiving the wireless signals. When the street lamp(s) 10 is(are) in the coverage range of the wireless signals, and other predetermined conditions are met, the street lamp(s) 10 turn on and emit light. Contrarily, when the street lamp(s) 10 is(are) out of the cover range of the wireless signals, the street lamp(s) 10 will not detect or receive the wireless signals, and remain off thus saving power. The predetermined conditions may include, but are not limited to, the signals being received during nighttime or dark conditions, and poor visibility due to rain or fog.

Figure 2:
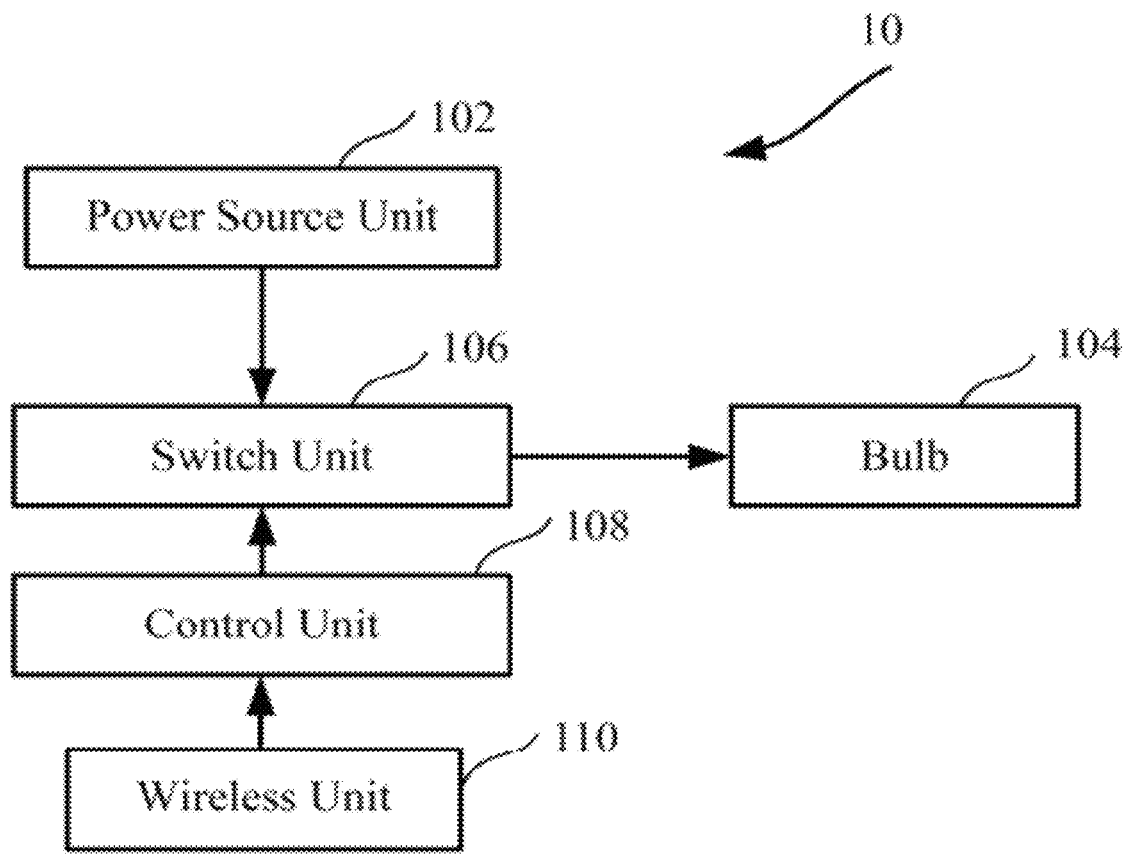
FIG. 2 is a block diagram of a hardware infrastructure of an illumination apparatus of FIG. 1 according to a first embodiment.

Referring to FIG. 2, the illumination apparatus (i.e., the street lamp) 10 includes a power source unit 102, a bulb 104, a switch unit 106, a control unit 108, and the wireless unit 110.

The power source unit 102 is configured for supplying power to the bulb 104. The switch unit 106 is configured for opening or closing a circuit between the power source unit 102 and the bulb 104.

The wireless unit 110 is configured for receiving the wireless signals from the control device 20, and generating a first control signal to the control unit 108 when receiving the wireless signals. In other exemplary embodiments, the wireless unit 110 may generate the first control signal when signal strength of the received wireless signals satisfies a predetermined value.

The control unit 108 is configured for receiving the first control signal from the wireless unit 110, and generating a close signal to the switch unit 106 according to the first control signal. The switch unit 106 closes the circuit between the power source unit 102 and the bulb 104 in response to the close signal, so as to enable the bulb 104 to emit light during the time the wireless unit 110 receives the wireless signals. Contrarily, when the switch unit 106 does not receive the close signal, namely the wireless unit 110 does not receive the wireless signals, and the control unit 108 does not receive the first control signal, the switch unit 106 opens the circuit between the power source unit 102 and the bulb 104, thereby keeping the bulb 104 off and saving power.

Figure 3:
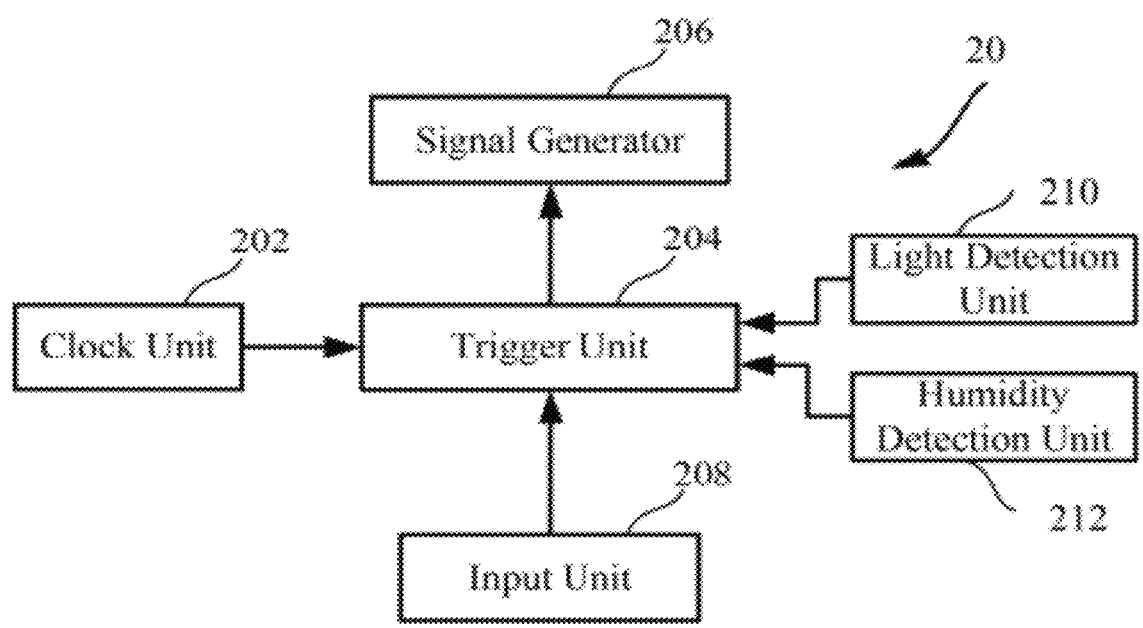
FIG. 3 is a block diagram of a hardware infrastructure of a control device of FIG. 1 according to a first exemplary embodiment.

Referring to FIG. 3, the control device 20 includes a clock unit 202, a trigger unit 204, a signal generator 206, an input unit 208, a light detector 210 and a humidity detection unit 212. The clock unit 202 is configured for providing system time of the control device 20 to the trigger unit 204. The trigger unit 204 is configured for generating a control signal when the system time of the clock unit 202 is in a predetermined time range, and sending the control signal to the signal generator 206, wherein the predetermined time range is usually defined as a night time period. The signal generator 206 is configured for generating the wireless signals to enable the street lamp(s) 10, which is(are) in the cover range of the wireless signals, to emit light, in response to the control signal from the trigger unit 204.

The input unit 208 is configured for generating an input trigger signal to the trigger unit 204 in response to a user input. The light detection unit 210 is configured for detecting ambient light and generating a light trigger signal to the trigger unit 204 when the detected ambient light is below a predetermined light level. In other words, the light detection unit 210 is configured for detecting whether there is sufficient ambient light for traffic. The humidity detection unit 212 is configured for detecting ambient humidity, and generating a humidity trigger signal to the trigger unit 204 when the detected ambient humidity satisfies a predetermined humidity value. During foggy or rainy weather, although the ambient light may not be below the predetermined light level, visibility may be poor, and so it is desirable to have the street lamps 10 on when traffic is present.

The trigger unit 204 is further configured for generating the control signal in response to the trigger signals including the input trigger signal, the light trigger signal, and the humidity trigger signal from the input unit 208, the light detection unit 210, and the humidity detection unit 212. In such configuration, the control device 10 is not only capable of automatically generating the wireless signals, but is also capable of being manually operated to generate the wireless signals by a user when desired.

In addition, the control mechanism on the street lamps 10 can also be applied to other illumination apparatus, such as billboards, traffic lights, signposts, and so on. Furthermore, in other exemplary embodiments, the wireless unit 110 of the street lamps 10 and the signal generator 206 of the control device 20 can be arranged according to a predetermined layout so as to enable the receiving operation of the wireless unit 110 and the transmitting operation of the signal generator 206 to be along a predetermined direction. For example, the wireless unit 110 is configured for receiving the wireless signals whose spread direction is the same as the driving direction of the automobile 15. Consequently, in the nighttime, only the street lamps 10, which are on the same side of the street as that of the automobile 15, are turned on to emit light, and street lamps 10 on the other side of the road are not be turned on, thereby saving power.

Figure 4:
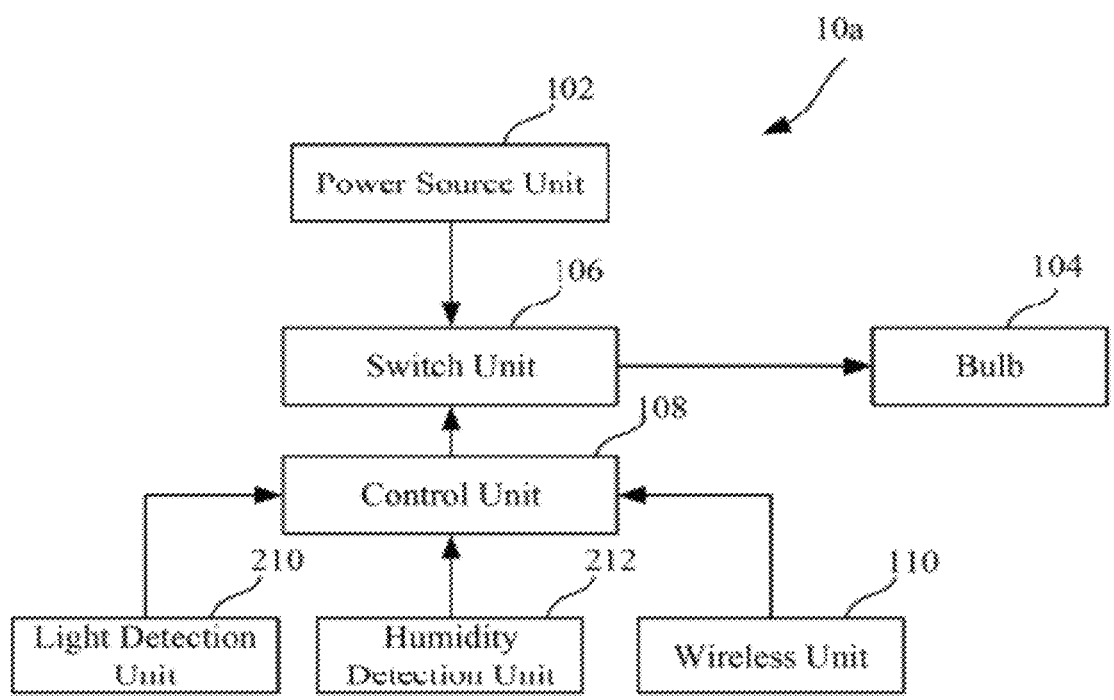
FIG. 4 is a block diagram of a hardware infrastructure of an illumination apparatus of FIG. 1 according to a second embodiment.

FIG. 4 is a block diagram of a hardware infrastructure of an illumination apparatus of FIG. 1 according to a second embodiment. The differences between the illumination apparatus 10a of FIG. 4 and the illumination apparatus 10a of FIG. 1 are that the illumination apparatus 10 of FIG. 2 further includes the light detection unit 210 and the humidity detection unit 212.

The light detection unit 210 is configured for detecting ambient light and generating a second control signal to the control unit 108 when the detected ambient light is below a predetermined light level. The humidity detection unit 212 is configured for detecting ambient humidity, and generating a third control signal to the control unit 108 when the detected ambient humidity satisfies a predetermined humidity value.

Additionally, the control unit 108 generates the close signal to the switch unit 106 according to the first control signal and the second control signal or according to the first control signal and the third control signal. That is, during foggy or rainy weather, the bulb 104 is powered on to provide auxiliary light when traffic is present and visibility is poor even during the daylight hours.

Figure 5:
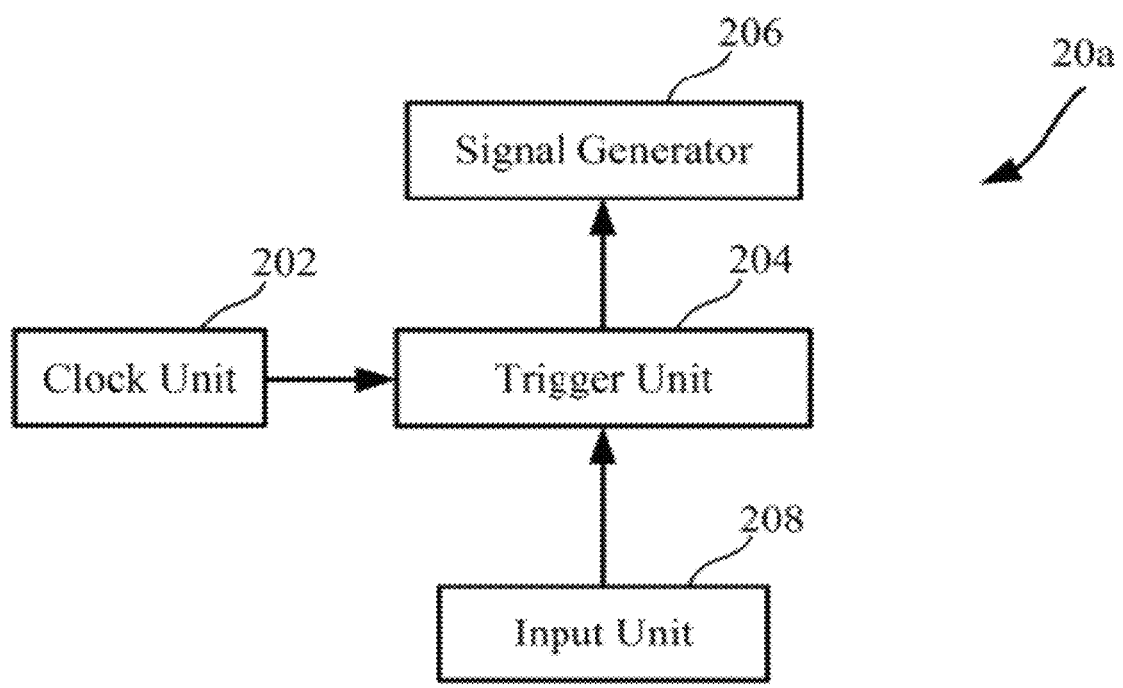
FIG. 5 is a block diagram of a hardware infrastructure of a control device of FIG. 1 according to a second exemplary embodiment.

FIG. 5 is a block diagram of a hardware infrastructure of a control device of FIG. 1 according to a second exemplary embodiment. The differences between the control device 20a of FIG. 5 and the control device 20 of FIG. 3 are that the control device 20a doesn't include the light detection unit 210 and the humidity detection unit 212 accordingly.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:
1. An illumination apparatus comprising:
a bulb;
a power source unit configured for supplying power to the bulb;
a switch unit configured for opening or closing a circuit between the power source unit and the bulb;
a wireless unit configured for receiving wireless signals generated from an external control device, and generating a first control signal when receiving the wireless signals;
a control unit configured for receiving the first control signal from the wireless unit, and generating a close signal to the switch unit according to the first control signal; and
a humidity detection unit configured for detecting ambient humidity, and generating a third control signal to the control unit when the detected ambient humidity satisfies a predetermined humidity value; wherein the control unit generates the close signal when receiving the first control signal and the third control signal, and
wherein the switch unit closes the circuit between the power source unit and the bulb in response to the close signal, so as to enable the bulb to keep emitting light during the wireless unit receives the wireless signals; and the switch unit opens the circuit between the power source unit and the bulb if no receiving the close signal, thereby keeping the bulb extinguishing during the wireless unit does not receive the wireless signals.

2. The illumination apparatus of claim 1, wherein the wireless unit generates the first control signal when signal strength of the received wireless signals satisfies a predetermined value.

3. The illumination apparatus of claim 1, further comprising a light detection unit configured for detecting ambient light, and generating a second control signal to the control unit when the detected ambient light does not satisfies a predetermined light level; wherein the control unit generates the close signal when receiving the first control signal and the second signal.

4. The illumination apparatus of claim 1, wherein the illumination apparatus is a street lamp.

5. The illumination apparatus of claim 1, wherein the control device is a mobile object.

6. An illumination apparatus comprising:
a bulb;
a power source unit configured for supplying power to the bulb;
a switch unit configured for opening or closing a circuit between the power source unit and the bulb;
a wireless unit configured for receiving wireless signals generated from an external control device, and generating a first control signal when receiving the wireless signals; and
a control unit configured for receiving the first control signal from the wireless unit, and generating a close signal to the switch unit according to the first control signal;
wherein the switch unit closes the circuit between the power source unit and the bulb in response to the close signal, so as to enable the bulb to keep emitting light during the wireless unit receives the wireless signals; and the switch unit opens the circuit between the power source unit and the bulb if no receiving the close signal, thereby keeping the bulb extinguishing during the wireless unit does not receive the wireless signals, and
wherein the wireless unit of the illumination apparatus and a signal generator of the external control device which generates the wireless signals are arranged according to a predetermined layout so as to enable a receiving operation of the wireless unit and a transmitting operation of the signal generator to be along a predetermined direction.

7. The illumination apparatus of claim 6, further comprising a light detection unit configured for detecting ambient light, and generating a second control signal to the control unit when the detected ambient light does not satisfies a predetermined light level; wherein the control unit generates the close signal when receiving the first control signal and the second signal.

8. The illumination apparatus of claim 6, further comprising a humidity detection unit configured for detecting ambient humidity, and generating a third control signal to the control unit when the detected ambient humidity satisfies a predetermined humidity value; wherein the control unit generates the close signal when receiving the first control signal and the third control signal.

9. The illumination apparatus of claim 8, wherein the wireless unit generates the first control signal when signal strength of the received wireless signals satisfies a predetermined value.

10. The illumination apparatus of claim 8, wherein the illumination apparatus is a street lamp.

11. The illumination apparatus of claim 8, wherein the control device is a mobile object.

* * * * *